United States Patent [19]
Katsume et al.

[11] 3,902,317
[45] Sept. 2, 1975

[54] VARIABLE GEOMETRY NOZZLE CONTROL SYSTEM FOR A TWO SHAFT GAS TURBINE ENGINE FOR AUTOMOTIVE VEHICLE

[75] Inventors: Tetsuo Katsume, Yokosuka; Shinichi Yamazaki, Fujisawa, both of Japan

[73] Assignee: Nissan Motor Co., Ltd., Yokahama, Japan

[22] Filed: Nov. 29, 1973

[21] Appl. No.: 419,939

[30] Foreign Application Priority Data
Dec. 4, 1972 Japan.............................. 47-120737

[52] U.S. Cl................................. 60/39.25; 60/39.16
[51] Int. Cl.²........................................ F02C 9/02
[58] Field of Search............. 60/39.25, 39.03, 39.04, 60/39.16; 415/36

[56] References Cited
UNITED STATES PATENTS

| | | | |
|---|---|---|---|
| 3,186,165 | 6/1965 | Edkins | 60/39.25 X |
| 3,508,395 | 4/1970 | Sebestyen | 60/39.25 |
| 3,585,796 | 6/1971 | Lewis | 60/39.25 X |
| 3,757,610 | 9/1973 | Kubota | 60/39.25 |
| 3,772,880 | 11/1973 | Kubota | 60/39.28 R |
| 3,814,537 | 6/1974 | Stoltman | 415/36 |

Primary Examiner—Clarence R. Gordon
Attorney, Agent, or Firm—Frank J. Jordan

[57] ABSTRACT

A control system which provides a scheduled transitional nozzle position control signal when the actual speed of a gas producer can not follow the demanded speed of the gas producer speed. The signal represents a scheduled nozzle position which is wider than normal nozzle position.

1 Claim, 1 Drawing Figure

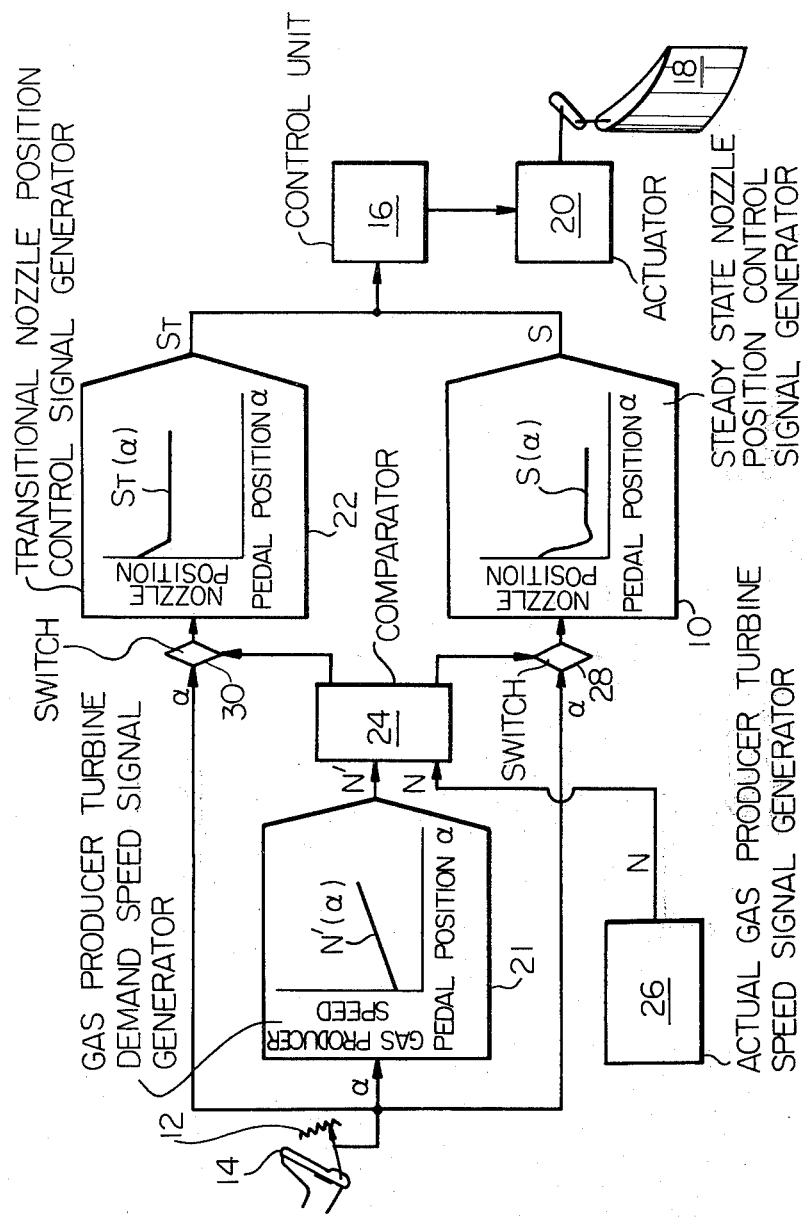

VARIABLE GEOMETRY NOZZLE CONTROL SYSTEM FOR A TWO SHAFT GAS TURBINE ENGINE FOR AUTOMOTIVE VEHICLE

The present invention relates to a nozzle control system for a two-shaft gas turbine engine for an automotive vehicle. Such an engine commonly comprises a gas producer turbine connected to drive a compressor and a power turbine connected to drive driving wheels and nozzles located between the gas producer turbine and the power turbine to vary the power output.

The gas producer turbine must be operated to rotate at a speed matching the speed of the power turbine. It is sometimes difficult to achieve this over the whole operating range of the engine, and the compressor may tend to produce a surge within certain parts of the range particularly during a relatively rapid acceleration demand.

In order to obtain the fastest possible acceleration of the gas producer, it is necessary to increase the fuel supply and to open the nozzle to the position at which it transfers the greatest amount of power to the gas producer turbine. This is the so-called "neutral" position.

However, it has been common practice in the nozzle control to open the nozzle relatively little to obtain fuel economy during steady state operation including partial load operation. This results in sluggish response of the gas producer to acceleration demand, and in extreme cases, results in gas producer surges.

It is accordingly a principal object of the present invention to provide an improved nozzle control system for a two-shaft gas turbine engine for an automotive vehicle for the gas producer turbine to smoothly and rapidly respond to acceleration demand.

Further objects and advantages of the invention will be come apparent from the following detailed description of a preferred embodiment taken in conjunction with the accompanying drawing.

In the accompanying drawing a single FIGURE shows a diagrammatic view of a nozzle control system embodying the present invention.

The nozzle control system comprises a steady-state nozzle position control signal generator 10 connected at its input to a potentiometer 12 to receive therefrom a signal $\alpha$ dependent on the position of a control pedal 14. The generator 10 is connected at its output to a control unit 16. The generator 10 is a function generator which is designed to provide a steady state nozzle control signal $S(\alpha)$ defining the controlling degree of a nozzle vane 18, the signal S having a magnitude determining the controlling degree of the vane 18. The control unit 16 is operatively connected to a vane actuator 20 such that the vane 18 is rotated depending on the magnitude of the signal S. The above described devices are well known per se.

In accordance with the present invention the control system comprises a gas producer turbine demand speed signal generator 21 connected at its input to the potentiometer 12 to receive therefrom the signal $\alpha$. The generator 21 is also a function generator which is designed to provide a gas producer demand speed signal $N'(\alpha)$ corresponding to the experimentally determined speed of the gas producer versus the position of the pedal, the shape of a curve traced by $N'(\alpha)$ being shown. The control system further comprises a transitional nozzle position control signal generator 22, and a comparator 24. The generator 22 is connected at its input to the potentiometer 12 to receive therefrom the signal $\alpha$ and is connected at its output to the control unit 16. The generator 22 is a function generator which is designed to provide a transitional nozzle position control signal $S_T(\alpha)$ defining the operating degree of the nozzle vane 18 for acceleration. The comparator 24 is connected to the generator 21 to receive the signal N' therefrom and to an actual gas producer turbine speed signal generator 26 to receive a signal N dependent on the actual speed of the gas producer turbine. The generator 26 may be a tachometer coupled with a gas producer turbine shaft (not shown). The comparator 24 is operatively connected with a first switch 28 and a second switch 30, the switch 28 being connected with the generator 10 such that it de-energizes the generator 10 when opened, and the switch 30 connected with the generator 22 such that it energizes the generator 22 when closed.

The details of the comparator 24 will now be described. The comparator 24 is designed such that it compares the signals N' and N, and it closes the switch 28 when $$|N'-N| \leq 5 \text{ percent of } N' \ldots \quad (1)$$

and it closes the switch 30 when $$|N'-N| > 5 \text{ percent of } N' \ldots \quad (2)$$

It should be noted that the switch 30 is open when the switch 28 is closed, and vice versa, and that equation (1) represents steady state engine operation and equation (2) rapid acceleration state engine operation. It will now be understood that the generator 10 is energized when the equation (1) holds and the generator 22 energized when the equation (2) holds.

The operation of the control system as set forth above will now be described.

During steady state engine operation, the signal N representing the actual speed of the gas producer is equal or below N' and satisfies the equation (1). Thus the switch 28 is closed and the switch 30 opened. This causes the control unit 16 to regulate the controlling degree of the nozzle vane 18 depending on the magnitude of the signal S.

Upon rapid acceleration demand, the gas producer is apt to sluggishly increase its speed to the demanded speed represented by the signal N' which satisfies the equation (2). Thus the switch 28 is opened and the switch 30 closed. This causes the control unit 16 to change the controlling degree of the nozzle vane 18 to the so-called "neutral" position in dependence on the magnitude of the signal $S_T$. The gas producer speed signal accordingly increases with a minimum time to the level of N'.

When again the gas producer speed signal (N) satisfies the equation (1), then the switch 30 is opened and the switch 28 closed, and the controlling degree of the nozzle vane 18 is changed and again controlled in dependence on the magnitude of the signal S.

It will now be appreciated that the control system of the invention is able to accomplish rapid acceleration of the gas turbine without affecting fuel economy during steady state engine operation.

What is claimed is:

1. In a nozzle control system for a two-shaft gas turbine engine in an automotive vehicle, comprising a control pedal, a potentiometer operatively connected to the control pedal to produce at its output a first signal representing the position of the control pedal, a first function generator means for producing at its output a steady state nozzle position control signal which is a predetermined function of the first signal when actuated, the combination with the potentiometer of:
- a second function generator means for producing at its output a transitional control signal which is a predetermined function of the first signal when actuated;
- a third function generator means connected to the output of the potentiometer to receive the first signal for producing at its output a gas producer turbine demand speed signal which is a predetermined function of the first signal;
- a tachometric generator means for producing at its output an actual gas producer turbine speed signal which represents the speed of a gas producer turbine; and
- operable means comprising a comparator and two switches, said comparator being connected to the outputs of said third function generator means and said tachometric generator means, said two switches being interposed between said first function generator means and the output of said potentiometer and between said second function generator means and the output of said potentiometer, said operable means de-actuating said first function generator means and actuating said second function generator means when the actual gas producer turbine speed signal falls a predetermined amount.

* * * * *